(12) United States Patent
Sheppard et al.

(10) Patent No.: US 6,752,244 B2
(45) Date of Patent: Jun. 22, 2004

(54) APPARATUS FOR DRAINING FLUIDS FROM VEHICLES

(75) Inventors: Dean A. Sheppard, Calgary (CA); Philip J. Sheppard, Calgary (CA); Michael T. Sheppard, Calgary (CA); Gordon F. Sheppard, Calgary (CA)

(73) Assignee: Sheppard Holdings Ltd., Calgary (CA)

( * ) Notice: Subject to any disclaimer, the term of this patent is extended or adjusted under 35 U.S.C. 154(b) by 0 days.

(21) Appl. No.: 10/219,314

(22) Filed: Aug. 16, 2002

(65) Prior Publication Data

US 2004/0031645 A1 Feb. 19, 2004

(51) Int. Cl.[7] .................................................. E04G 1/00
(52) U.S. Cl. .................... 182/131; 182/132; 182/179.1; 137/234.6
(58) Field of Search .............................. 182/130, 131, 182/132, 113, 179.1; 137/234.6

(56) References Cited

U.S. PATENT DOCUMENTS

| | | | | |
|---|---|---|---|---|
| 3,651,970 A | * | 3/1972 | Black | 214/515 |
| 3,835,957 A | * | 9/1974 | Richards | 182/19 |
| 4,684,314 A | * | 8/1987 | Luth | 414/745 |
| 4,724,875 A | * | 2/1988 | Baldwin | 141/98 |
| 4,780,044 A | * | 10/1988 | Elskamp | 414/546 |
| 5,035,562 A | * | 7/1991 | Rosen | 414/240 |
| 5,120,022 A | * | 6/1992 | Kubik | 254/124 |
| 5,199,686 A | * | 4/1993 | Fletcher | 254/90 |
| 5,335,406 A | | 8/1994 | Van Den Mosselaar et al. | |
| 5,473,990 A | * | 12/1995 | Anderson et al. | 104/85 |
| 5,586,856 A | * | 12/1996 | Springer | 414/462 |
| 5,701,812 A | | 12/1997 | Van Den Mosselaar et al. | |
| 5,904,339 A | * | 5/1999 | Flinn | 254/88 |
| 5,931,043 A | * | 8/1999 | Liegel et al. | 72/457 |
| 6,223,855 B1 | | 5/2001 | Lindner | |
| 2002/0175319 A1 | * | 11/2002 | Green et al. | 254/45 |

FOREIGN PATENT DOCUMENTS

| | | |
|---|---|---|
| EP | 0 371 454 A2 | 11/1989 |
| EP | 0 544 342 B1 | 9/1992 |

* cited by examiner

Primary Examiner—Bruce A. Lev
(74) Attorney, Agent, or Firm—Sean W. Goodwin

(57) ABSTRACT

Apparatus for draining fluids from a vehicle has an elevated platform supported on a frame, the platform being pivotable side-to-side and end-to-end, to permit complete draining of fluids from the vehicle through an opening in the platform prior to dismantling the vehicle for scrapping. A unique bracket assembly connects one end of the platform to the frame at first and second perpendicular pivots, to permit pivoting about both a longitudinal and a transverse axis.

18 Claims, 18 Drawing Sheets

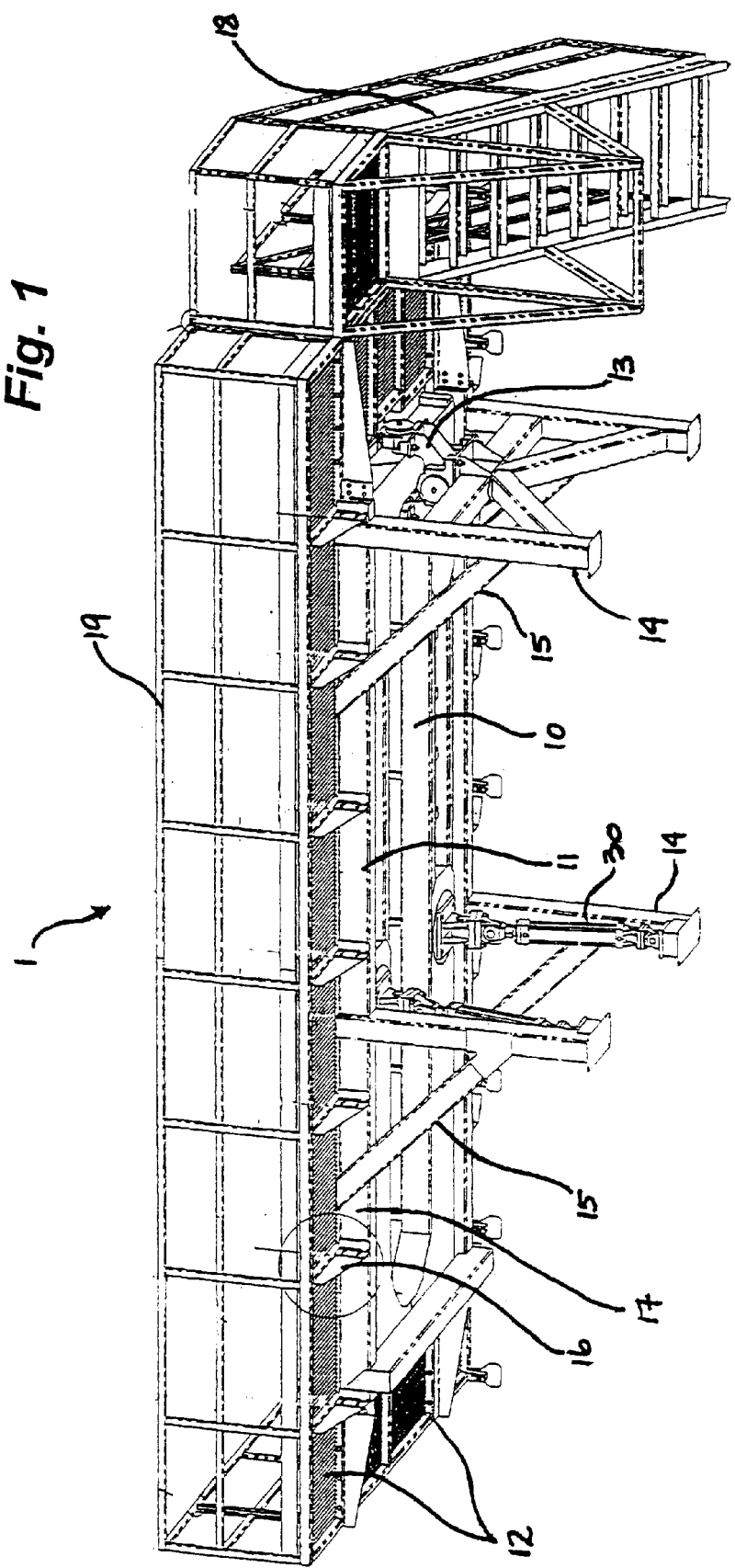

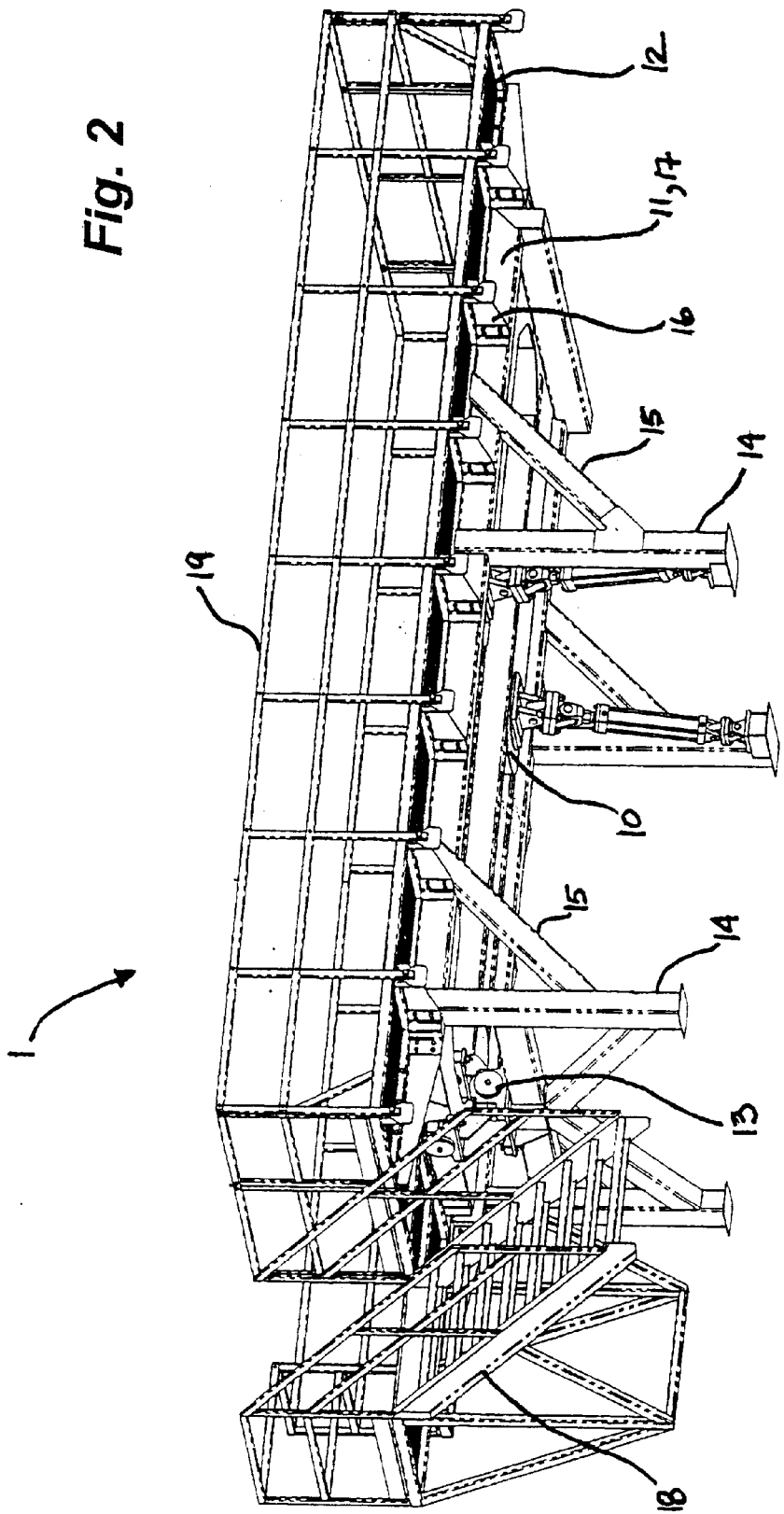

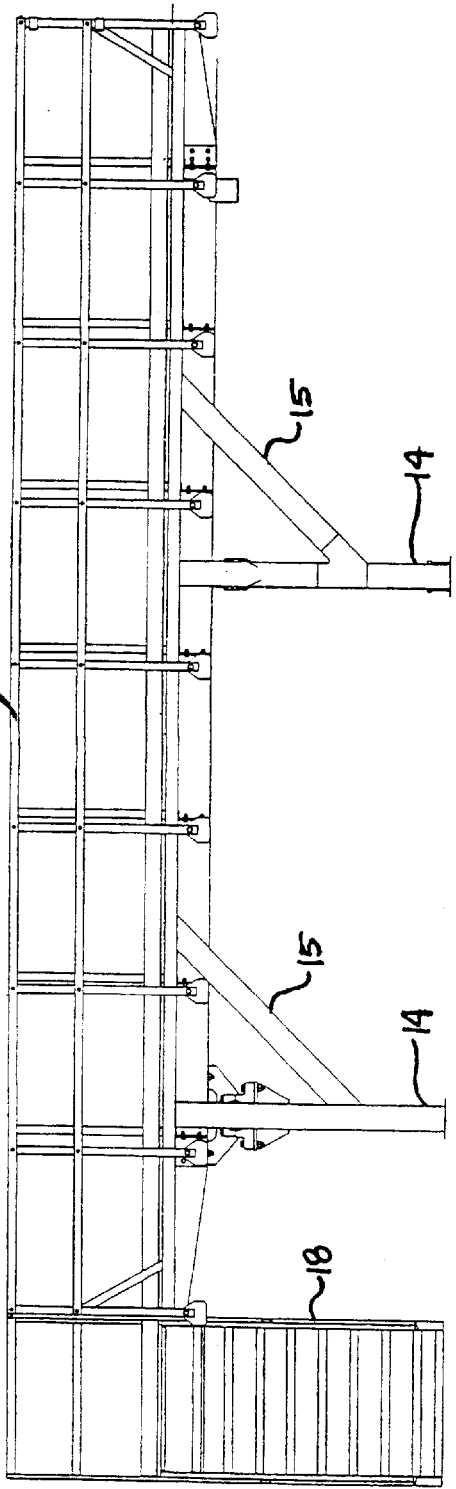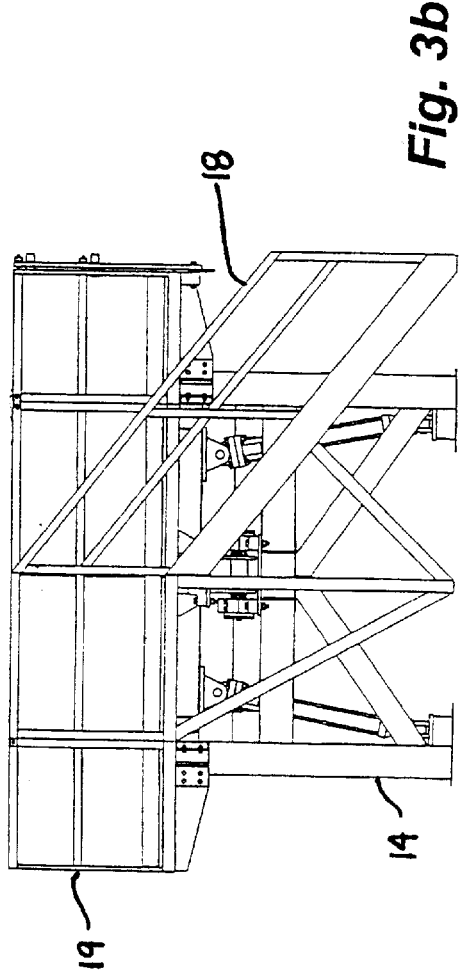
Fig. 3a
Fig. 3b

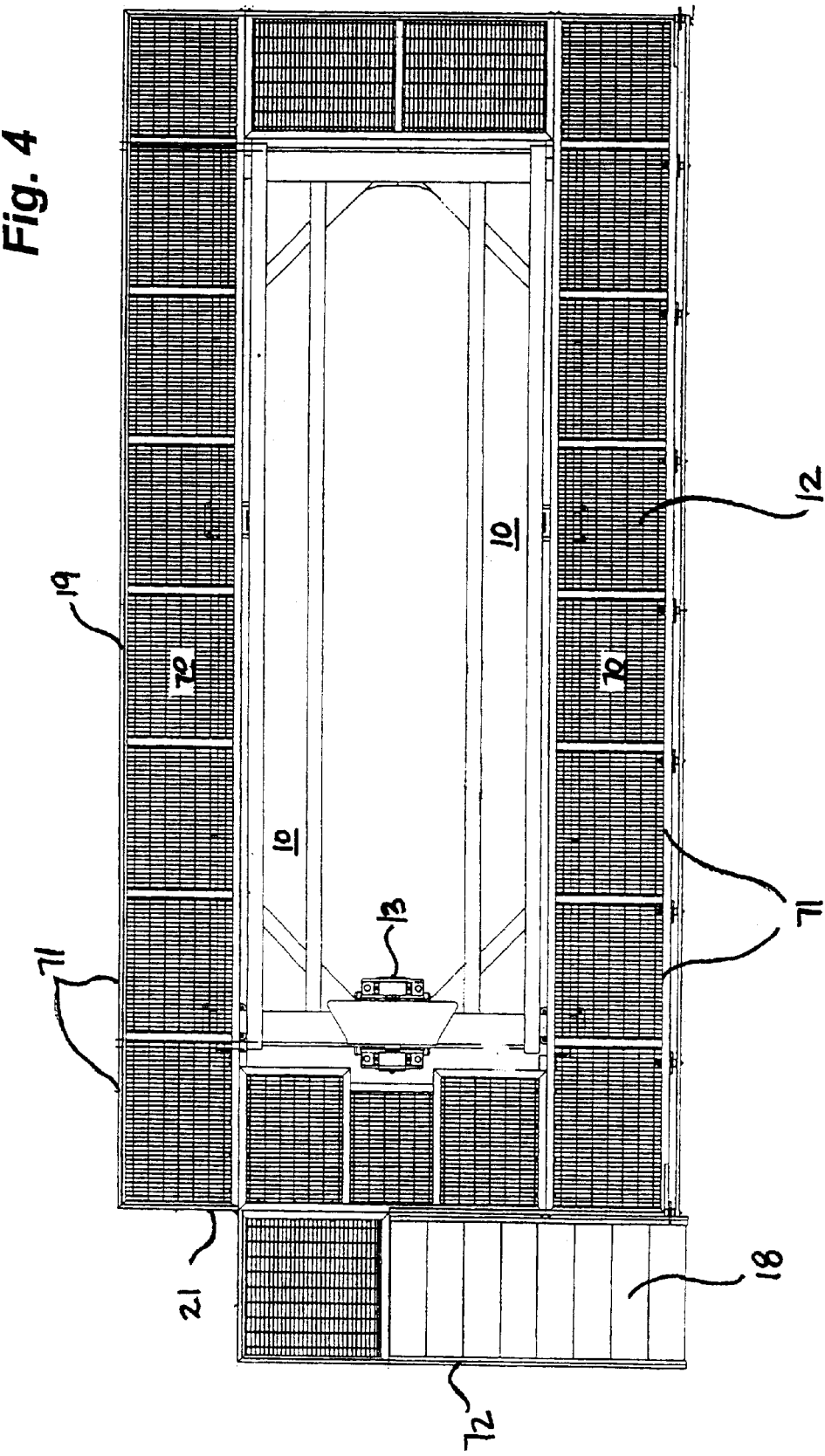

APPARATUS FOR DRAINING FLUIDS FROM VEHICLES

FIELD OF THE INVENTION

The invention relates to apparatus for facilitating the draining of fluids from vehicles and more particularly to draining fluids from vehicles prior to dismantling.

BACKGROUND OF THE INVENTION

In the majority of industrialized nations, millions of vehicles are scrapped each year. Usable parts are removed for sale in the used parts market and the reminder of the vehicles are treated as scrap metal. Prior to dismantling, all fluids, which typically are flammable and present an environmental hazard, are drained from the vehicle for proper disposal.

Most simply, vehicles have been placed over a pit, conventional ports are opened or new openings are formed to allow fluids to gravity drain into the pit or into drainage pans positioned within the pit. Alternatively, the vehicle is placed on an elevated platform and fluids allowed to drain into collection devices.

One such platform is taught in U.S. Pat. No. 6,223,855 B1 to Lindner. The vehicle is lifted by forklift and placed on a fixed elevated work platform surrounded by elevated, height adjustable work surfaces. The front work surfaces can be swiveled aside to allow access by the forklift. The tanks of the vehicle are perforated using a tank voiding module which permits the fluids to drain, however the platform supporting the vehicle cannot be tilted to permit more complete drainage of fluids from the vehicle. A suction device is used to attempt to remove as much fluid as possible and the fluid and vapors collected are fed out through a hose system to collection devices.

It is known that in many cases one cannot rely on gravity alone, with the car in a normally upright position, to ensure that all fluids are removed. Thus, platforms are known which also rotate the vehicle to cause fluids to be more completely drained.

EP patent 0 544 342 B1 to Van den Mosselaar describes a platform having a lifting and rotating frame. The frame is pivotable about a horizontal shaft such that when the vehicle is clamped into the frame it is lifted above the platform and rotated substantially 180 degrees to expose the bottom of the vehicle. Fluids otherwise trapped within the vehicle may then be free to drain into collection devices positioned below the vehicle. The apparatus of Van den Mosselaar is capable of pivoting in a single axis of rotation only which may leave fluids trapped at either end of the vehicle.

Clearly there is need for a vehicle articulation apparatus that is capable of elevating a vehicle for access by personnel and that can be pivoted in more than one axis of rotation for more complete drainage of fluids prior to disassembly.

SUMMARY OF THE INVENTION

An apparatus for draining fluids from a vehicle comprises a very simple frame supporting an elevated platform, the platform being pivotable relative to the frame about both a longitudinal and a transverse axis, to permit complete drainage of fluids from a vehicle positioned on the platform. The platform has an opening to facilitate draining of the fluids therethrough.

In a broad aspect of the invention, the vehicle articulation apparatus for draining fluids from a vehicle comprises: a platform having a drain opening formed therein, the platform being adapted to receive and support the vehicle positioned over the opening; a frame to support the platform; first and second pivots connected between a first end of the platform and the frame, the second pivot being connected to the first pivot, the first and second pivots being perpendicular to one another to permit pivoting of the platform relative to the frame about a longitudinal axis and about a transverse axis; and at least two control means connected to the platform and independently operable to permit rotation of the platform about either or both the first and second pivots so as to tilt the platform side-to-side and end-to-end to ensure maximum drainage of fluids from the vehicle through the opening.

In a preferred embodiment of the invention, the elevation means are hydraulic rams, pivotally connected at both ends between the frame and the platform, such that when either or both of the rams is actuated the frame is caused to pivot about either or both the longitudinal and the transverse axis.

Preferably the rams are situated midway between a first and second end of the frame to achieve an acceptable compromise between leverage and displacement of the platform.

The first and second pivots are preferably superimposed, one on top of the other, through a unique bracket assembly. The bracket assembly comprises a lower pivot base which is connected, preferably by welding, to the frame and which has a pair of upstanding, opposing pillow block bearings supporting a lower pivot pin. An upper pivot base is connected to and pivotable with the lower pivot pin. The upper pivot base supports a second pair of upstanding pillow block bearings, oriented 90 degrees to the lower pillow block bearings. The upper pivot base is pivotally connected to the platform through a second upper pivot pin supported in the upper pillow block bearings. Thus connected, the platform is pivotable about either or both the upper and lower pivot as a result of movement of the hydraulic rams.

Additionally, elevated work surfaces are positioned about the platform and supported by the frame to permit an operator to access the vehicle for dismantling, during draining or after the fluids have been completed drained from the vehicle. The elevated work surfaces are accessible through a staircase connected to the elevated surfaces. The underside of the vehicle is accessible from beneath the raised platform.

BRIEF DESCRIPTION OF THE DRAWINGS

FIG. 1 is a rear perspective view of the underside of an articulation apparatus of the present invention;

FIG. 2 is a front perspective view of the underside of the apparatus of FIG. 1;

FIG. 3a is a front view according to FIG. 1;

FIG. 3b is an end view of the first end of the apparatus showing a staircase connected to the apparatus;

FIG. 4 is a plan view according to FIG. 1;

FIG. 6b is a plan view according to FIG. 6a;

FIG. 6c is a side view according to FIG. 6a;

FIG. 6d is an end view according to FIG. 6a;

FIG. 7 is a lower perspective view according to FIG. 6a;

DETAILED DESCRIPTION OF THE PREFERRED EMBODIMENT

Figure 5A:
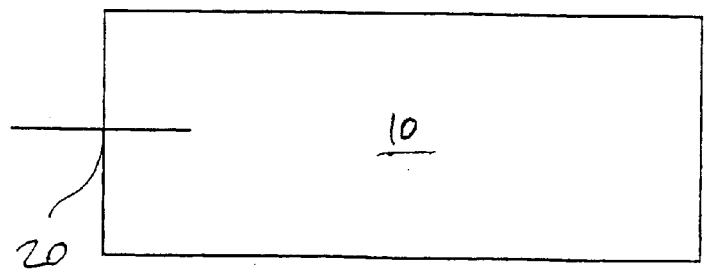
FIG. 5a is a schematic plan view illustrating the two independent axes of rotation of the platform of the invention according to FIG. 1.
Figure 5B:
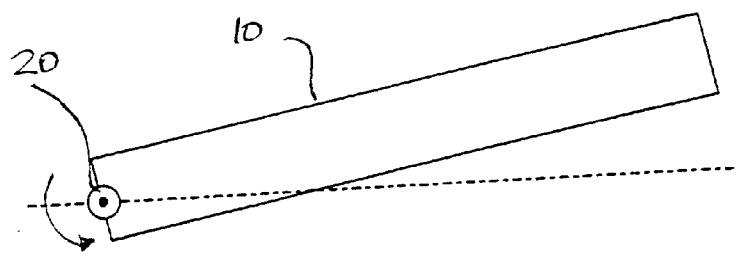
FIG. 5b is a schematic side view of the platform illustrating rotation of the platform rotating about a transverse axis.
Figure 5C:
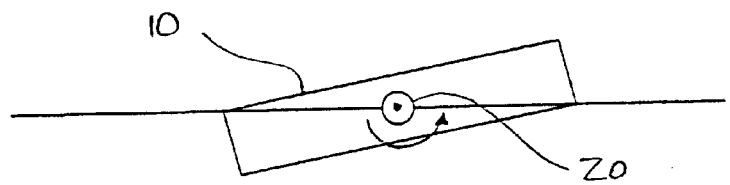
FIG. 5c is a schematic end view of the platform illustrating rotation of the platform about a longitudinal axis.
Figure 6A:
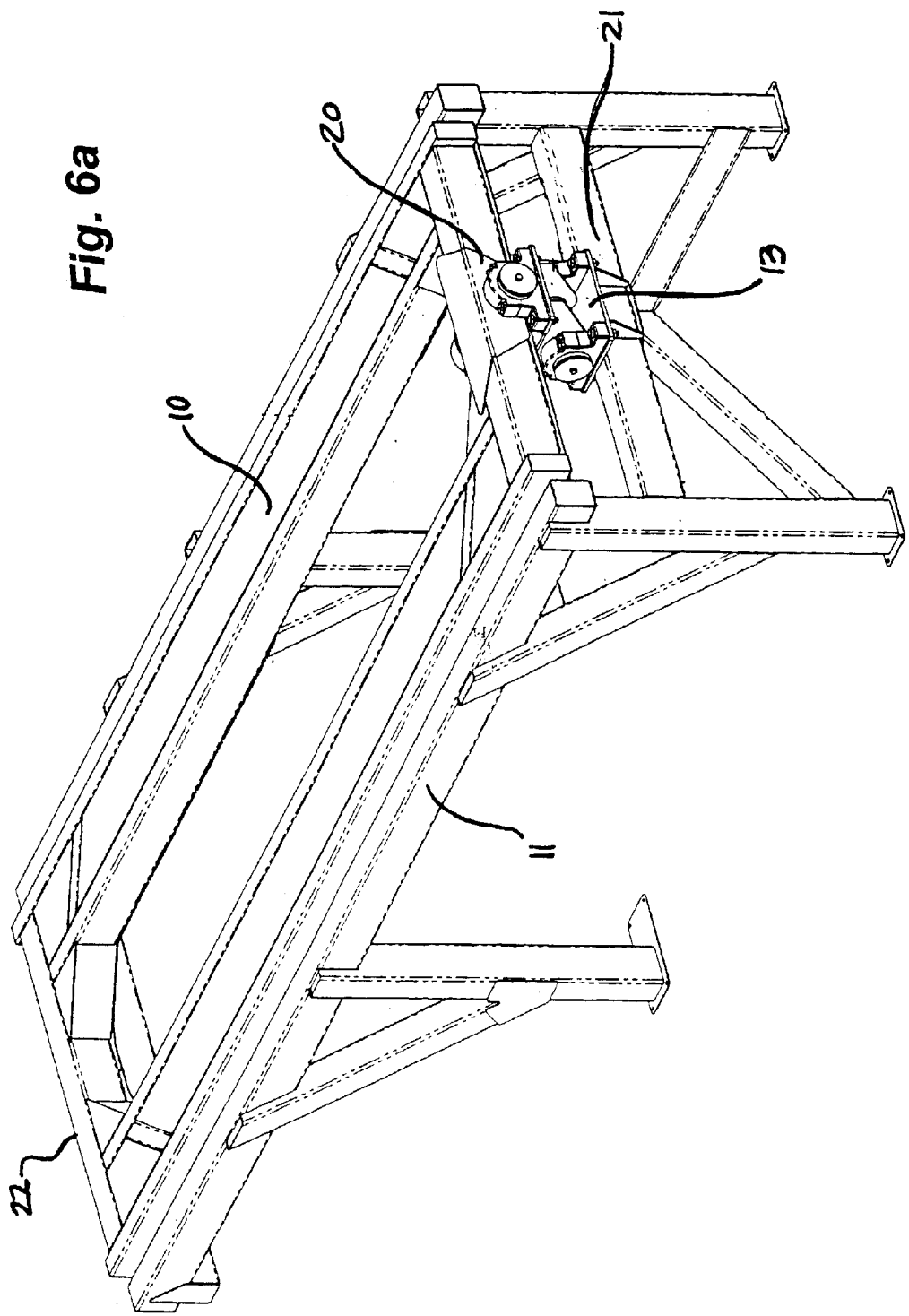
FIG. 6a is an end perspective view of a frame and platform according to FIG. 1, the work surfaces removed to permit viewing of the frame.
Figure 6B:
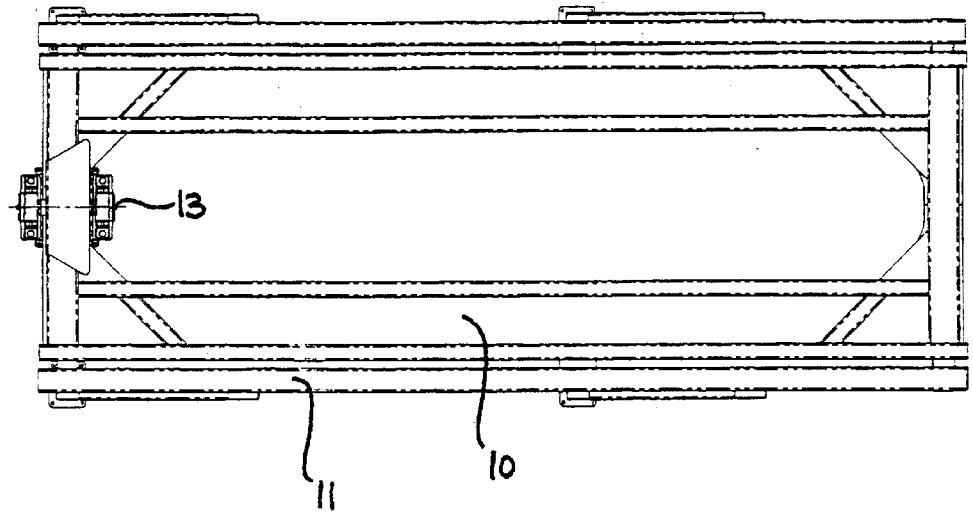
Figure 6C:
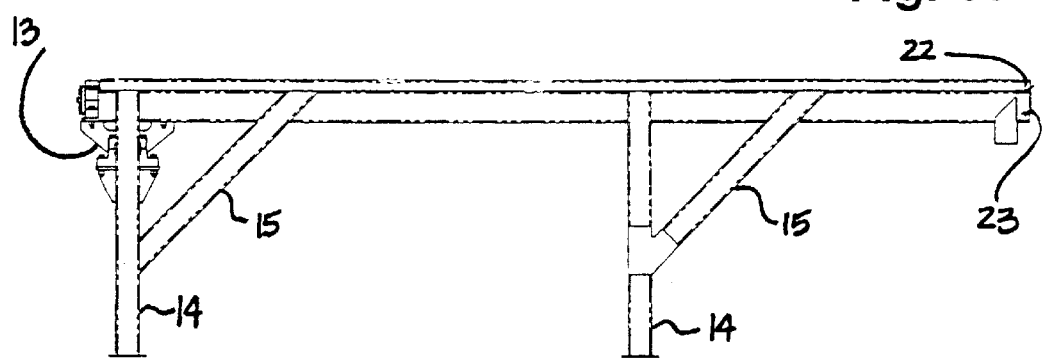
Figure 6D:
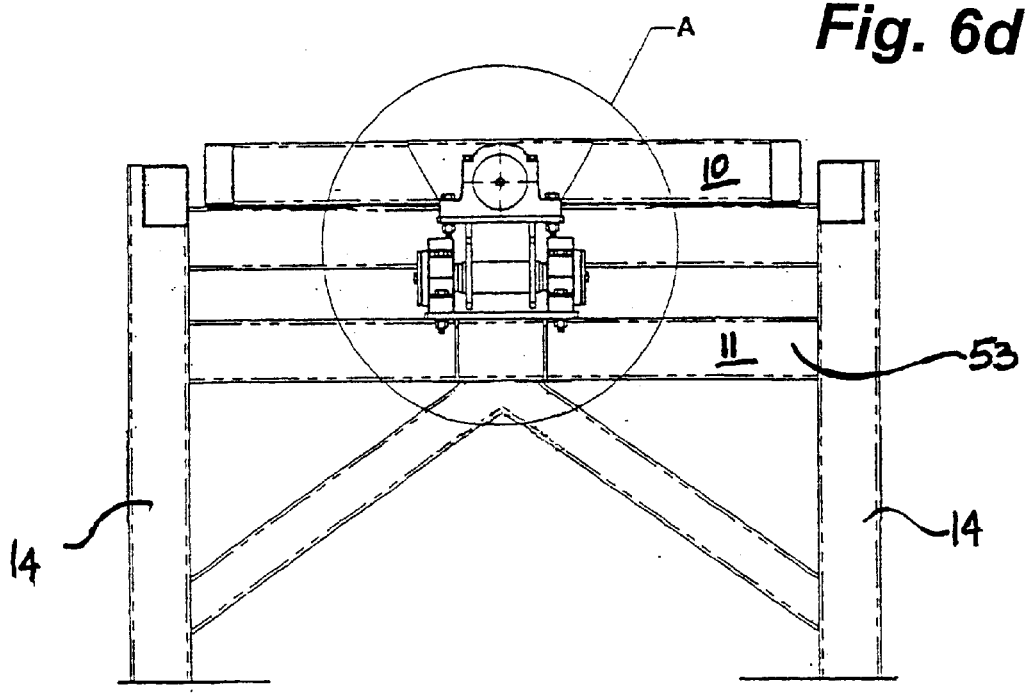
Figure 6E:
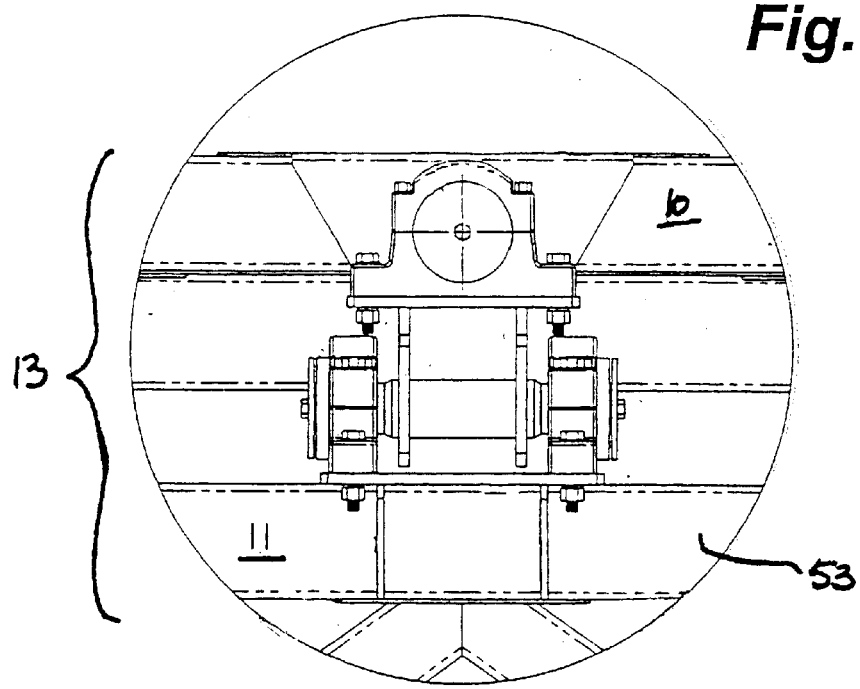
FIG. 6e is a partial end view according to FIG. 6a, showing the pivotal connection between the frame and the platform.

Having reference to FIGS. 1–4, a vehicle articulation apparatus 1 of the present invention is shown. An articulated platform 10 is supported above the ground within an elevated, rectangular open frame 11 around which, a plurality of work surfaces 12 are suspended. The platform 10 is pivotally connected 13 to the frame 11 to permit articulation of the platform 10 about two independent axes relative to the frame 11 and thus permit tilting of a vehicle (not shown) placed upon the platform 10, in order to drain fluids from the vehicle.

In a preferred embodiment of the invention, the rectangular frame 11 is supported above the ground by a plurality of legs 14, further supported by struts 15 connected between the legs 14 and the frame 11. The work surfaces 12 are suspended from the frame 11 by a plurality of clips 16 welded to the frame 11 and extending outwards from the frame 11 beneath the work surfaces 12, at intervals, about a periphery 17 of the frame 11. Access to the work surfaces 12 is typically by a staircase 18. Further, the work surfaces 12 are surrounded by a guardrail 19 for safety of personnel operating on the elevated work surfaces 12.

As shown in greater detail in FIGS. 4–6e, the platform 10 is pivotally connected 13 at a first pivot end 20 to a first end 21 of the frame 11. The second end 22 of the platform 10 is freely moveable relative to the frame 11. The pivotal connection 13 permits the platform 10 to be rotated in two planes, as shown in FIGS. 5a–c, about a transverse axis (FIG. 5b) and about a longitudinal axis (FIG. 5c). Rotation in more than one direction permits a vehicle, placed upon the platform 10, to be tilted side-to-side and end-to-end to ensure maximum drainage of fluids trapped within the vehicle, prior to being dismantled.

Figure 7:
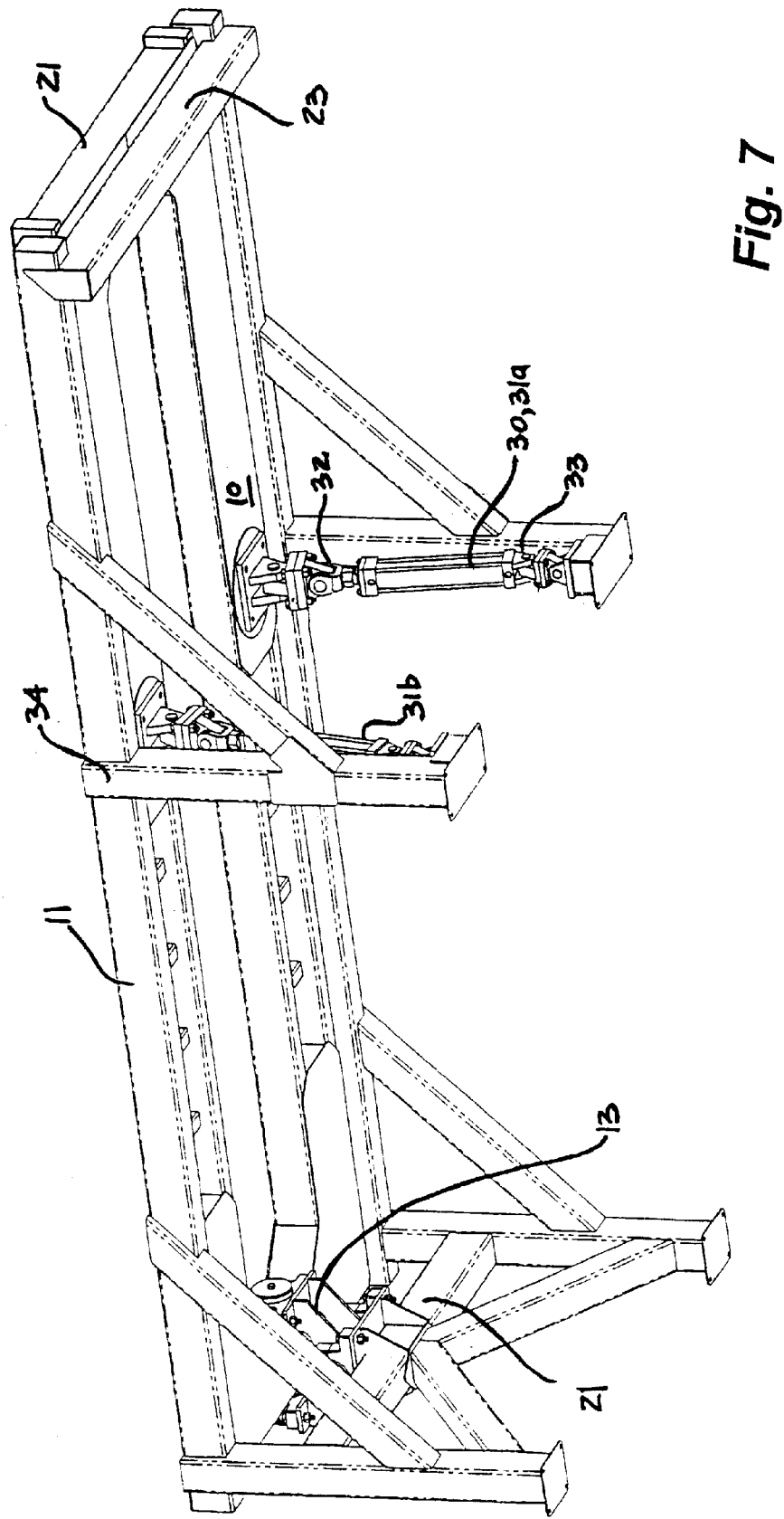

At least two independent control means 30 are provided to rotate the platform's pivotal connection 13, about either or both of the axes. Preferably, the control means are elevation means such as hydraulic rams 31, as shown in FIGS. 1, 2, and 7, which are positioned beneath the platform 10. When actuated, to either raise or lower, the hydraulic rams 31a, 31b control rotation of the platform 10.

In a preferred embodiment of the invention and, as shown in greater detail in FIGS. 7–10, the hydraulic rams 31a, 31b are pivotally connected at both upper 32 and lower 33 ends between the frame 11 and the platform 10 at approximately a midpoint 34 between the first 21 and second 23 ends of the frame 11. The positioning of the hydraulic rams 31a, 31b is to achieve an acceptable compromise between leverage and displacement of the platform 10. Each ram 31a, 31b is angled inward at the upper end 32 relative to a convenient connection to a supporting leg 14 at its lower end 33.

Figure 8A:
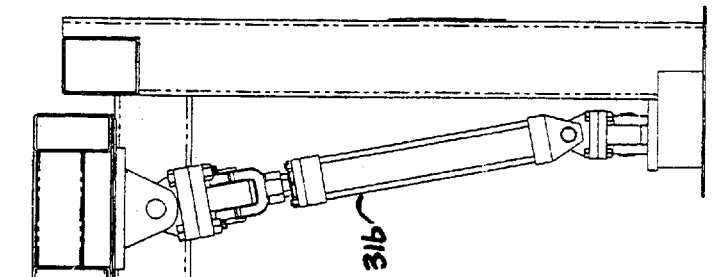
FIG. 8a is a sectional view of the hydraulic rams connected between the frame and the supporting legs shown along lines A—A of FIG. 1.
Figure 8C:
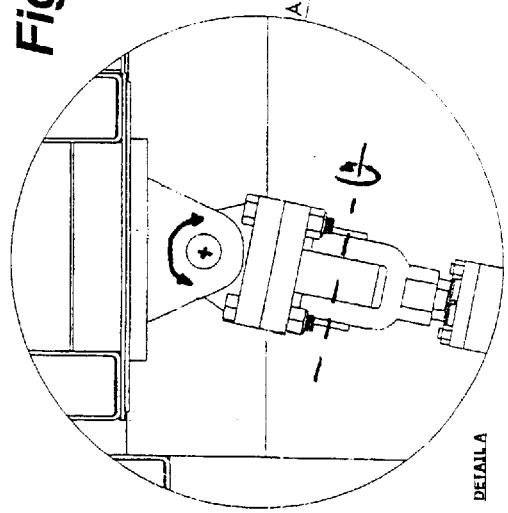
FIG. 8c is a detailed end view of the connection of a lower end of a hydraulic ram to a base of a supporting leg of the frame.
Figure 8B:
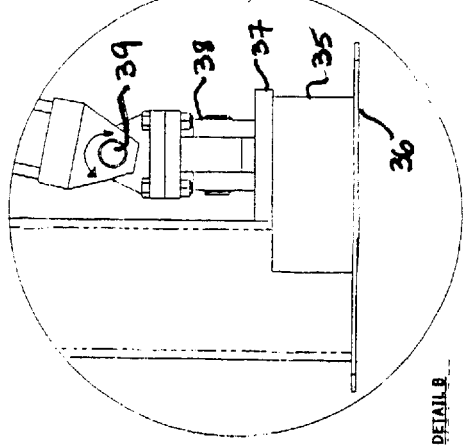
FIG. 8b is a detailed end view of the connection of an upper end of a hydraulic ram to an underside of the platform.
Figure 9:
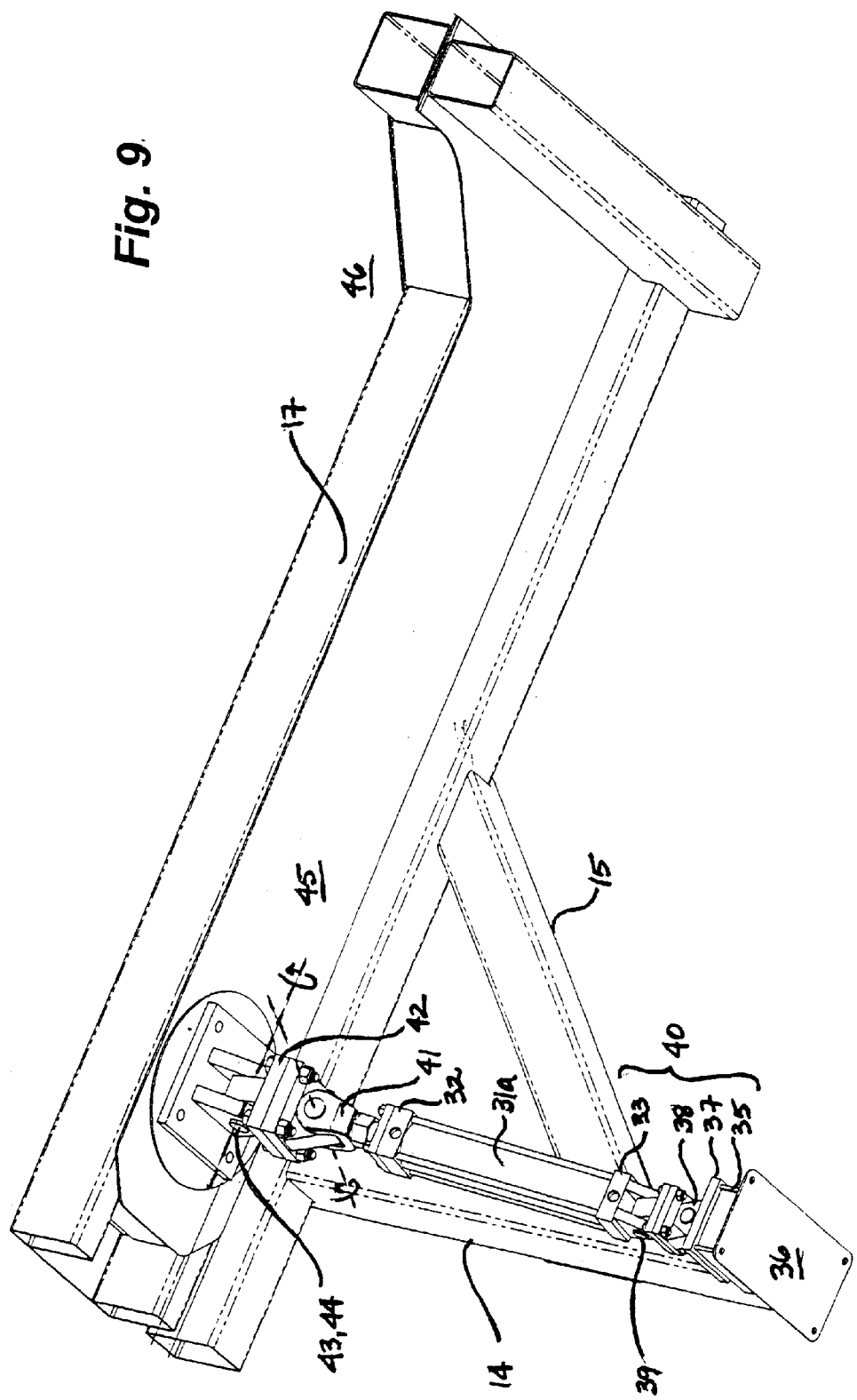
FIG. 9 is a partial underside view of a section of the frame and platform showing the connection of the hydraulic ram to an underside surface of a periphery of the platform.
Figure 11:
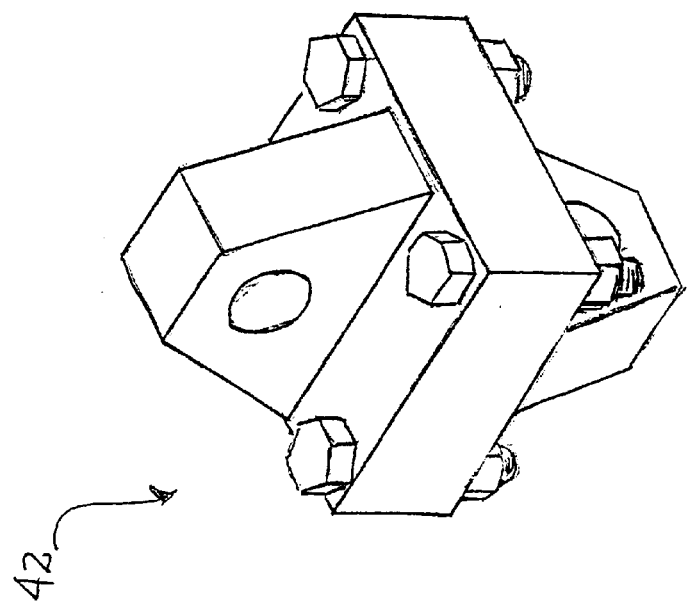
FIG. 11 is a perspective view of an upper pivot bracket for connecting an upper end of the hydraulic ram fitted with a female clevis ram to an upper mounting plate.
Figure 10:
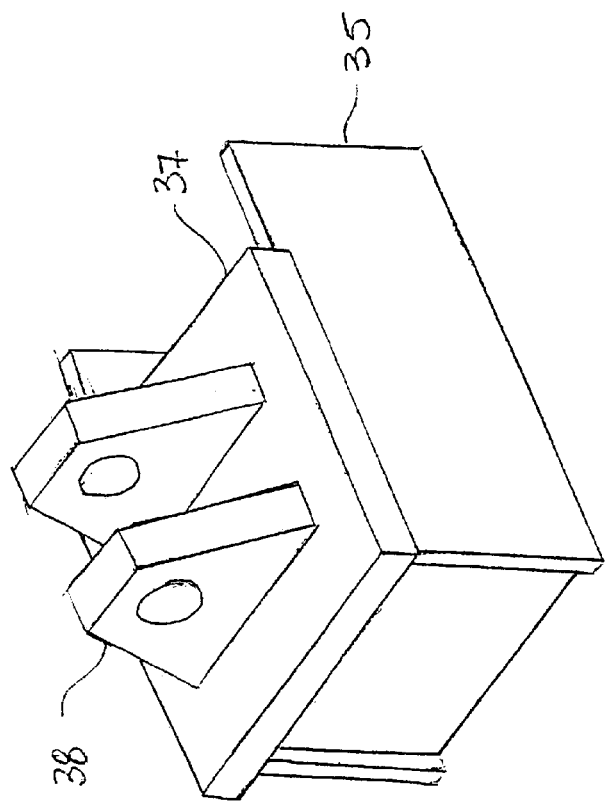
FIG. 10 is a perspective view of a support plate and a pivot bracket base for connecting a lower end of the hydraulic ram to the frame's supporting leg.
Figure 12:
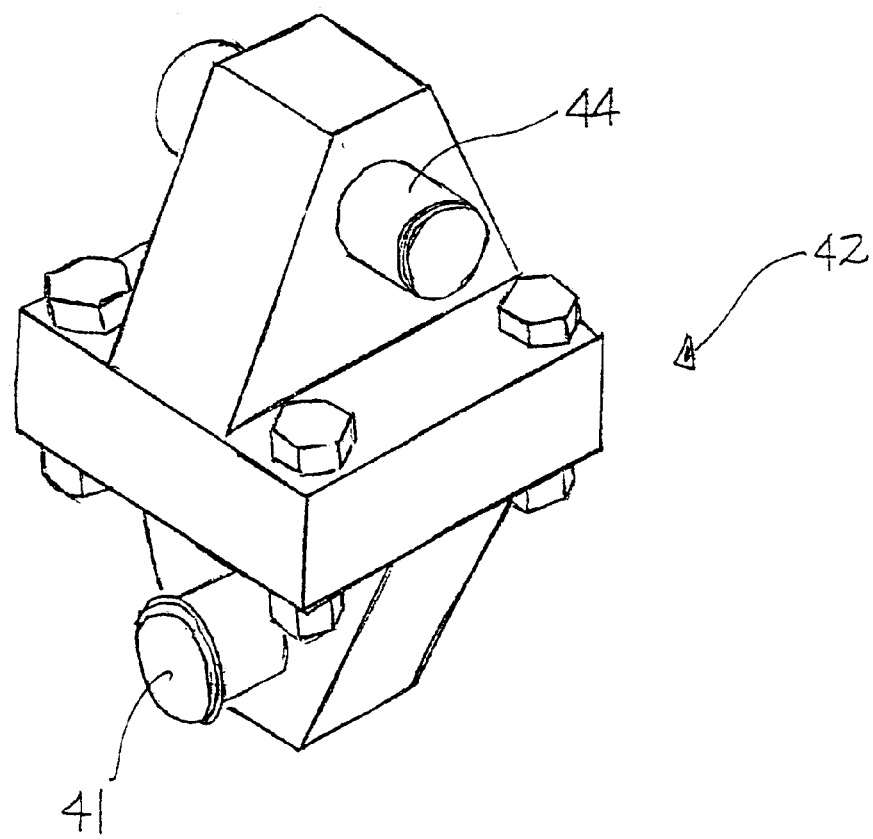
FIG. 12 is a perspective view of the pivot bracket of FIG. 11 shown supporting two pivot pins one oriented to the platform's longitudinal axis and the other to its transverse axis.
Figure 13:
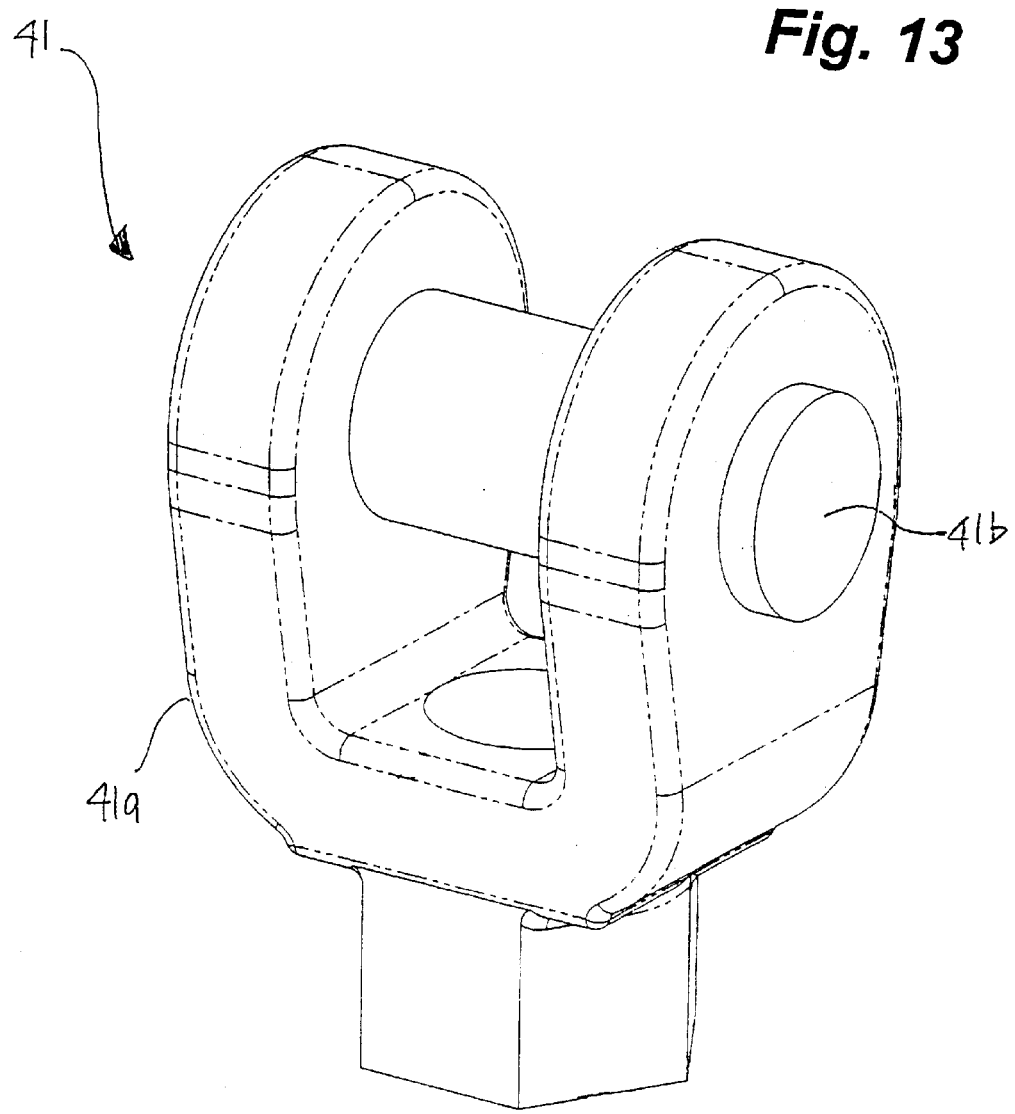
FIG. 13 is a detailed perspective view of the female clevis and pin assembly for the hydraulic rams.

As shown in greater detail in FIGS. 8a, 8b and 10, the lower end 33 of each ram 31 is connected to the adjacent frame leg 14 at a support plate 35, welded to the leg base 36. A pivot bracket base 38 is connected atop the support plate 35 for supporting a pivot bracket 38. The lower end 33 of the ram 31 is pivotally connected to the pivot bracket 38 by a pin 39, which permits rotation of the ram 31 about the frame's longitudinal axis. The pivotal connection 40 permits the ram 31 to move in response to changes in the side-to-side tilting of the platform 10.

As shown in greater detail in FIGS. 8a, 8c and 11–13, the upper end 32 of the ram 31 is fit with a female rod clevis and pin assembly 41, oriented 90 degrees to the axis of rotation of the lower pivot connection 40, to permit rotation of the ram 31 about the frame's transverse axis during end-to-end tilting of the platform 10. Further, an upper mounting bracket 42 is supported on the clevis assembly 41, which is pivotally connected to the platform 10 at an upper mounting plate 43 by an upper pin 44. The upper mounting plate 43 is welded to the platform 10 and the pivot 44 is oriented 90 degrees to the clevis assembly the pin 41b of the clevis 41a to permit rotation of the ram 31 about the longitudinal axis of the frame 11 and thus permit response to changes in side-to-side tilting of the platform 10. Preferably, the upper mounting plate 43 is welded to an underside 45 of the enclosed periphery 17 of the platform 10, while a center portion 46 of the platform 10 is open to permit access to the bottom of a vehicle supported on the platform 10.

Figure 14:
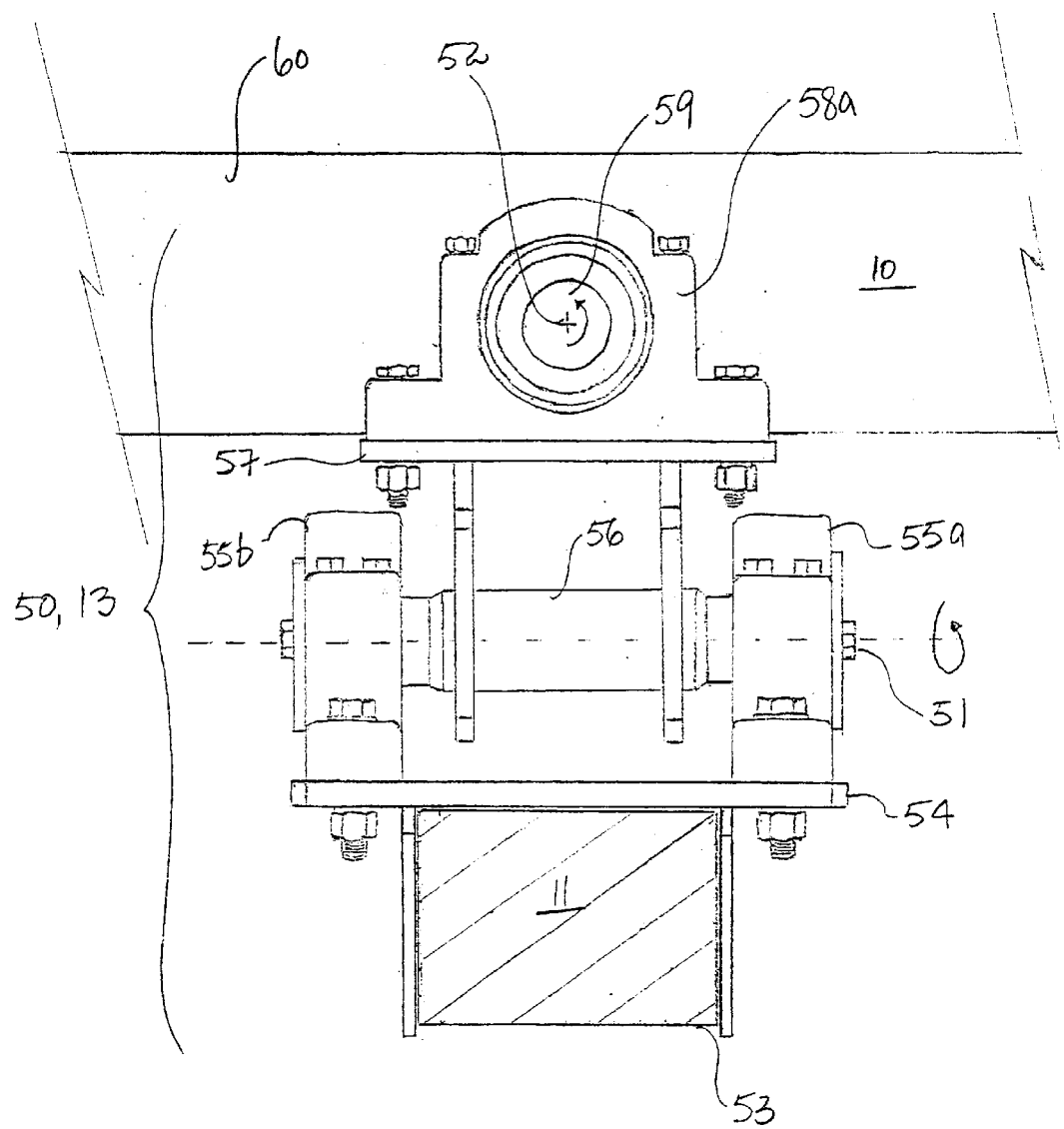
FIG. 14 is an end view of the pivotal connection between the frame and the platform.

Best shown in FIG. 14, the pivotal connection 13 between the frame 11 and the platform 10 is accomplished by first and second perpendicular pivots 51, 52 supported in a bracket assembly 50 connected between the frame 11 and the platform 10. Preferably, the first and second pivots 51, 52 are superimposed, which permit rotation of the platform 10 about the longitudinal and transverse axes in response to changes in elevation of one or both of the hydraulic rams 31. One of the pivots 51, 52 is connected to the platform 10 and the other pivot 51, 52 is connected to the frame 11. The first lower pivot 51 is welded to a cross member 53 of the first end 21 of the frame 11 at a first lower pivot base 54. The cross member 53 is positioned below the first end 20 of the platform 10 to permit superimposing the pivots 51, 52 and to provide sufficient space for side-to-side tilting of the platform 10 relative to the frame 11. The first lower pivot base 54 supports two upstanding and opposing first pillow block bearings 55a, 55b for accepting a first lower pivot pin 56 therethrough, to permit pivoting of the second upper pivot 52 independently about the platform's transverse axis resulting in end-to-end tilting of the platform 10. The first lower pivot pin 56 supports a second upper pivot base 57 to which are connected a second pair of upstanding, opposing pillow block bearings 58a, 58b (58b hidden from view), oriented 90 degrees to the lower pivot block bearings 55a, 55b, through which a second, upper pivot pin 59 is supported. The second upper pivot pin 59 is passed through a hole (not shown) in a cross member 60 at the first end 20 of the platform 10, permitting the platform 10 to pivot independently about the longitudinal axis as a result of a change in elevation of one of the two hydraulic rams 31a, 31b resulting in a side-to-side tilting of the platform 10.

It can be appreciated that the orientation of the lower and upper pivots 51, 52 and connections could be reversed with respect to the frame 11 and the platform 10 without altering the spirit of the invention.

Figure 15:
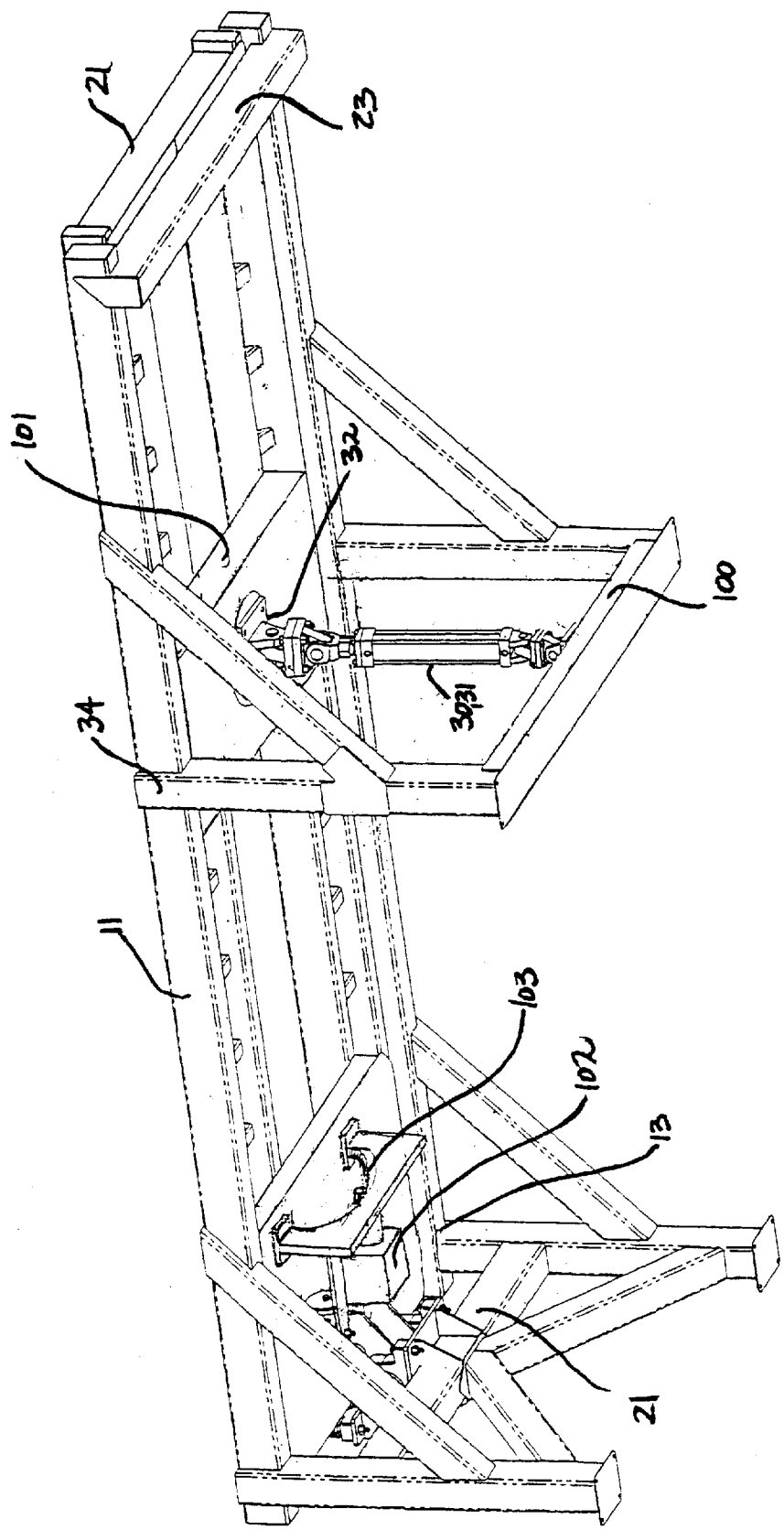
FIG. 15 is a lower perspective view of an alternate embodiment of the invention showing a single hydraulic ram positioned at a center of the platform for rotating the platform about the transverse axis.
Figure 16:
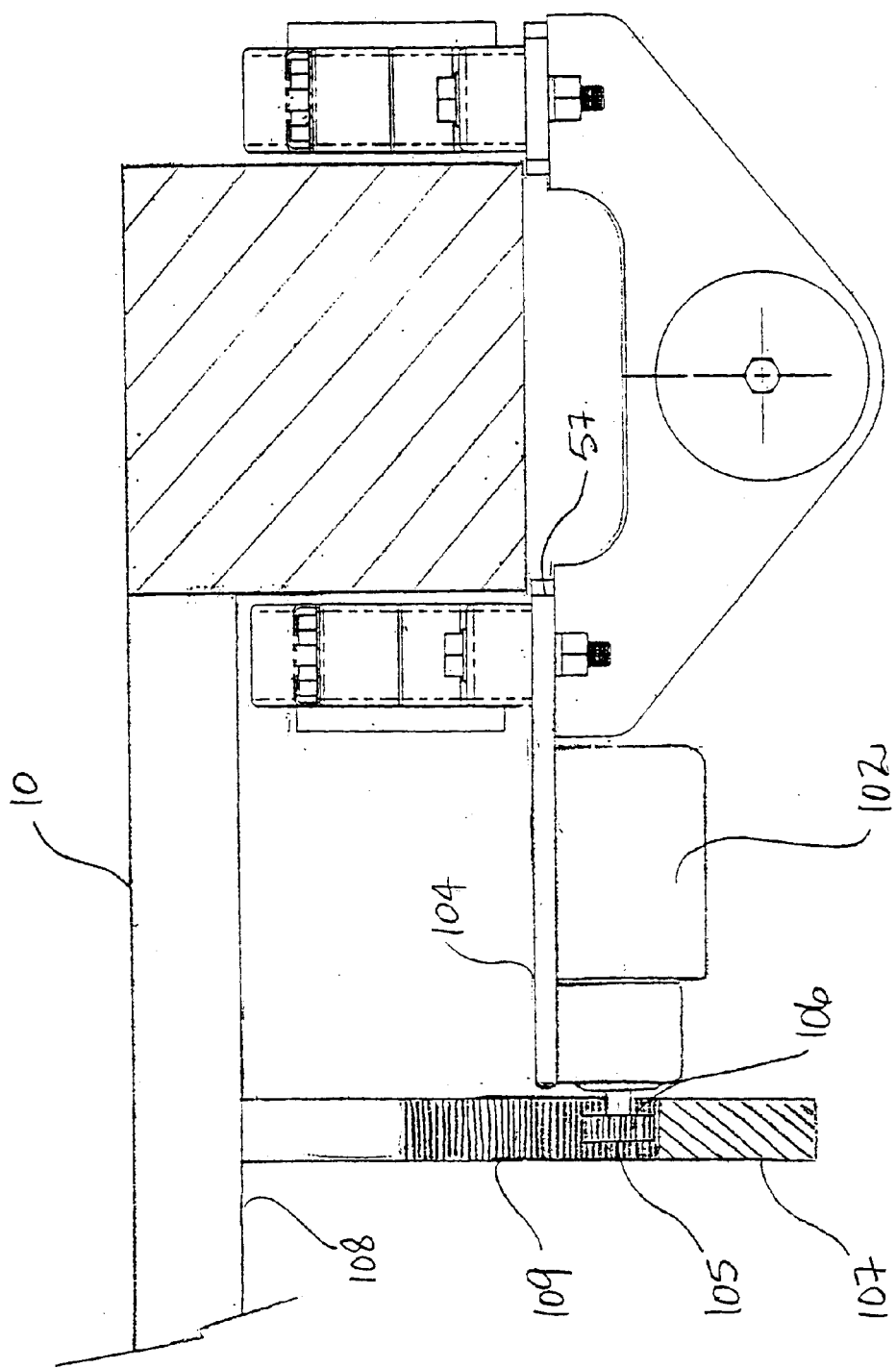
FIG. 16 is a side view according to FIG. 15 having a gear motor and gear attached to the upper pivot bracket and a gear attached to the underside of the platform for rotating the platform about the longitudinal axis.
Figure 17:
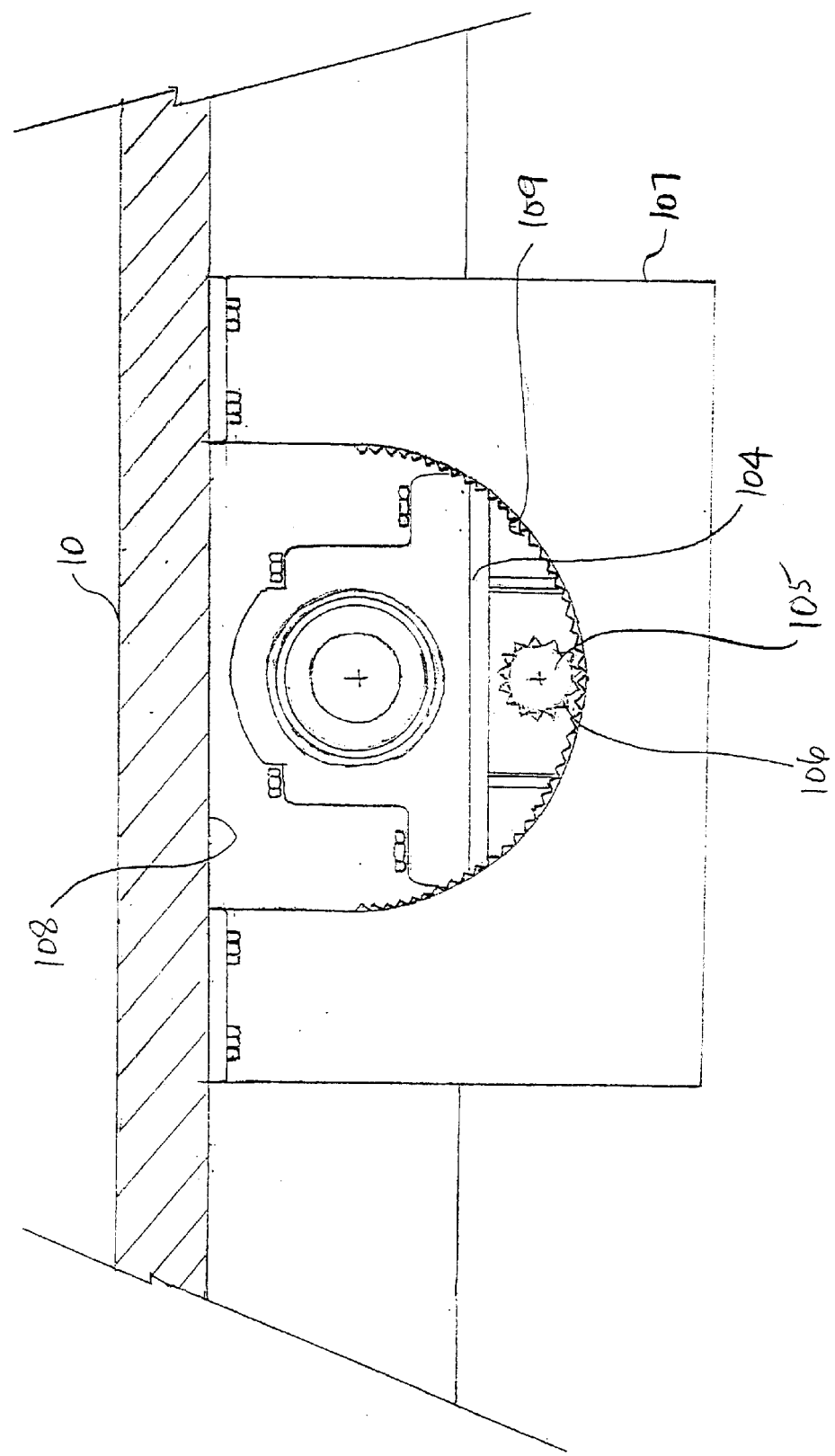
FIG. 17 is a partial end view according to FIG. 15 showing the relationship between the gear motor and the gear attached to the platform.

In an alternate embodiment of the invention, as shown in FIGS. 15–17, a first control means 30 is an elevation means, preferably a hydraulic ram 31 and is positioned at the centre of the platform 10, intermediate legs 14. An upper end 32 of the hydraulic ram 31 is connected to the center of the platform 10 at a support beam 101 and the lower end 33 is connected intermediate a support base 100 spanning between the legs 14. The connections at the upper 32 and lower 33 ends of the ram 31 are as previously described to permit the hydraulic ram 31 to react to rotation of the platform 10 in both longitudinal and transverse directions. Raising and lowering of the hydraulic ram 31, results in rotation of the platform 10 about the longitudinal axis. In this embodiment, the platform 10 remains open at the periphery 17.

A second control means 30, preferably a gear motor 102 and gear assembly 103 is connected between the platform 10 and the upper pivot base 57 which is connected to the platform 10. Operation of the gear motor 102 causes rotation of the platform 10 about the longitudinal axis.

As shown in FIG. 16, the gear motor 102 is connected below the second upper pivot base 57, preferably to an extension 104 of the second upper pivot base 57. Preferably, the gear assembly 103 comprises a first gear 105, having an outer gear face 106 and extending outwards and connected rotationally to the gear motor 102. The first gear 105 engages a second gear 107 connected to an underside 108 of the platform 10, the second gear 107 having an inner gear face 109. Rotation of the first gear 105 results in a rotation of the platform 10 about the longitudinal axis.

Preferably, as shown in FIG. 4, the work surfaces 12 are walkable work platforms 70 having permanently installed or removable grates 71. The work platforms 70 are at the same elevation as the articulating platform 10, when the articulating platform 10 has not been actuated. The staircase 18 to access the work platforms 70 is located at the first end 21 of the frame 11. The staircase 18 has a handrail 72 contiguous with the guardrails 19 surrounding the work surfaces 12.

In use, a vehicle is lifted, typically by a forklift, onto the raised platform 10 of the vehicle articulation apparatus 1. An operator, accessing the underside of the vehicle from below the opening 56 in the platform 10, opens all conventional drain ports. Optionally additional openings are formed in tanks and through the body of the vehicle. Drain pans are positioned beneath the vehicle to catch drained fluids. The platform 10 is actuated to tilt end-to-end, about its transverse axis, by raising both of the hydraulic rams 31. This permits fluids trapped in the end of the vehicle to be drained. Further, one of the hydraulic rams 31a, 31b is raised or lowered relative to the other, to cause the platform 10 to tilt side-to side about the longitudinal axis to permit fluids trapped at the sides of the vehicle to drain. Once the fluids are completely drained from the vehicle, or alternatively during the draining process, the vehicle can be dismantled directly on the platform 10, which is easily accessible via the elevated work surfaces 12 surrounding the platform 10. The remaining chassis can then be lifted from the platform 10 by forklift for disposal as scrap metal.

The embodiments of the invention in which an exclusive property or privilege are claimed are defined as follows:

1. Apparatus for draining fluids from a vehicle comprising:
    a platform having a drain opening formed therein, the platform being adapted to receive and support the vehicle positioned over the opening;
    a frame to support the platform;
    first and second pivots connected between a first end of the platform and the frame, the second pivot being connected to the first pivot, the first and second pivots being perpendicular to one another to permit pivoting of the platform relative to the frame about a longitudinal axis and about a transverse axis; and
    at least two control means connected to the platform and independently operable to permit rotation of the platform about either or both the first and second pivots so as to tilt the platform side-to-side and end-to-end to ensure maximum drainage of fluids from the vehicle through the opening.

2. The apparatus as described in claim 1 wherein
    the first pivot is oriented to permit pivoting of the platform about the longitudinal axis; and
    the second pivot is oriented to permit pivoting of the platform about the transverse axis.

3. The apparatus as described in claim 2 wherein the first and second pivots are superimposed, one over the other.

4. The apparatus as described in claim 2 wherein one of the at least two control means is an elevation means.

5. The apparatus as described in claim 4 wherein at least one of the at least two control means is a gear motor and gear assembly.

6. The apparatus as described in claim 5 wherein
    the gear motor is connected to either of the platform or the second pivot; and
    the gear assembly further comprises:
        a first gear attached to the gear motor; and
        a second gear attached to the other of the platform or the second pivot.

7. The apparatus as described in claim 4 wherein the elevation means is positioned at a center of the platform.

8. The apparatus as described in claim 7 wherein the elevation means is a hydraulic ram.

9. The apparatus as described in claim 2 wherein two of the at least two control means are elevation means.

10. The apparatus as described in claim 9 wherein the at least two elevation means are positioned below the platform and one of the at least two elevation means are positioned on either side of an underside of the platform relative to the longitudinal axis wherein when the one of the at least two elevation means is actuated relative to the others, the platform is caused to pivot about the longitudinal axis; and when all of the at least two elevation means are actuated in the same direction, the platform is caused to pivot about the transverse axis.

11. The apparatus as described in claim 9 wherein the elevation means are hydraulic rams.

12. The apparatus as described in claim 11 wherein the hydraulic rams are pivotally connected at either end between the frame and the platform to permit tilting of the platform about both the longitudinal and the transverse axes.

13. The apparatus as described in claim 11 wherein the hydraulic rams are pivotally connected between the platform and the frame.

14. The apparatus as described in claim 11 wherein the hydraulic rams are pivotally connected between the platform and the frame at approximately a midpoint between a first and a second end of the frame.

15. The apparatus as described in claim 11 wherein there are two hydraulic rams, positioned opposing each other on the underside of the platform at approximately a midpoint between a first and a second end of the platform and the frame.

16. The apparatus as described in claim 1 further comprising:

a bracket assembly for supporting the first and second pivots, the bracket assembly having:

a first pivot base connected to the frame and having two opposing first bearings accepting a first pivot pin; and a second pivot base supported rotatable on the first pivot pin and having two opposing second bearings oriented 90 degrees to the first bearings through which a second pivot pin is rotatable supported and connected to the platform.

17. The apparatus as described in claim 16 wherein the first and opposing second bearings are upstanding pillow block bearings.

18. The apparatus as described in claim 1 further comprising elevated work surfaces suspended from the frame and positioned about the platform.

* * * * *